United States Patent
Michal

[15] 3,662,933
[45] May 16, 1972

[54] CARRIER FOR FISHING POLES AND REELS READY TO USE

[72] Inventor: John Michal, P. O. Box 7, South Prairie, Wash. 98385

[22] Filed: June 3, 1970

[21] Appl. No.: 43,025

[52] U.S. Cl.............................................224/42.1 E, 43/26
[51] Int. Cl..............................................................B60r 9/04
[58] Field of Search..................224/42.1 E, 42.1 A, 42.1 G, 224/5.6, 5.7, 42.45 R; 43/26

[56] References Cited

UNITED STATES PATENTS

| | | | |
|---|---|---|---|
| 3,349,512 | 10/1967 | Walker | 43/26 |
| 2,902,790 | 9/1959 | Harvey | 43/26 |
| 2,536,797 | 1/1951 | Cooke | 224/42.45 A |
| 1,059,579 | 4/1913 | Tobey | 248/226 |

Primary Examiner—Philip Arnold
Attorney—Roy E. Mattern, Jr.

[57] ABSTRACT

A fully enclosable carrier or container receives one or more fishing poles with reels attached and fully rigged ready for fishing. During storage and travel the carrier protects the fishing equipment fully rigged from damage or theft. Also the carrier is adaptable for convenient mounting anywhere and especially to vehicles.

1 Claim, 3 Drawing Figures

Patented May 16, 1972

3,662,933

INVENTOR
JOHN MICHAL
BY Roy G Mattern Jr.
ATTORNEY

CARRIER FOR FISHING POLES AND REELS READY TO USE

BACKGROUND OF INVENTION

Fishing equipment containers and/or carriers have been offered before. However, none are known to accommodate the complete assembly of a rod, reels and line and even the lure fully protecting them from damage. For example, in U.S. Pat. Nos. 2,536,797 and 2,807,398 vehicle carriers are illustrated; however, the fishing poles and reels although clamped in place are otherwise exposed to damage and/or theft.

SUMMARY OF INVENTION

Any person wanting to carry one or more fishing poles is provided a durable, attractive, easily mounted, convenient carrier which will carry a fully extended pole in a completely enclosed container safely and conveniently out of the way. The foam-rubber lined chamber for the reels affords added protection for the delicate portions of the pole. This metal carrier protects the poles at all times from the elements or damage in normal transit and provides the added safety of locks to secure the poles against theft.

The carrier may be securely fastened to an automobile or to a pickup "camper" as for example, as shown in the drawings, by threaded "L" shaped bolts which are attached to a top carrier for a small boat.

DRAWINGS OF PREFERRED EMBODIMENTS

DESCRIPTION OF PREFERRED EMBODIMENTS

Figure 1:
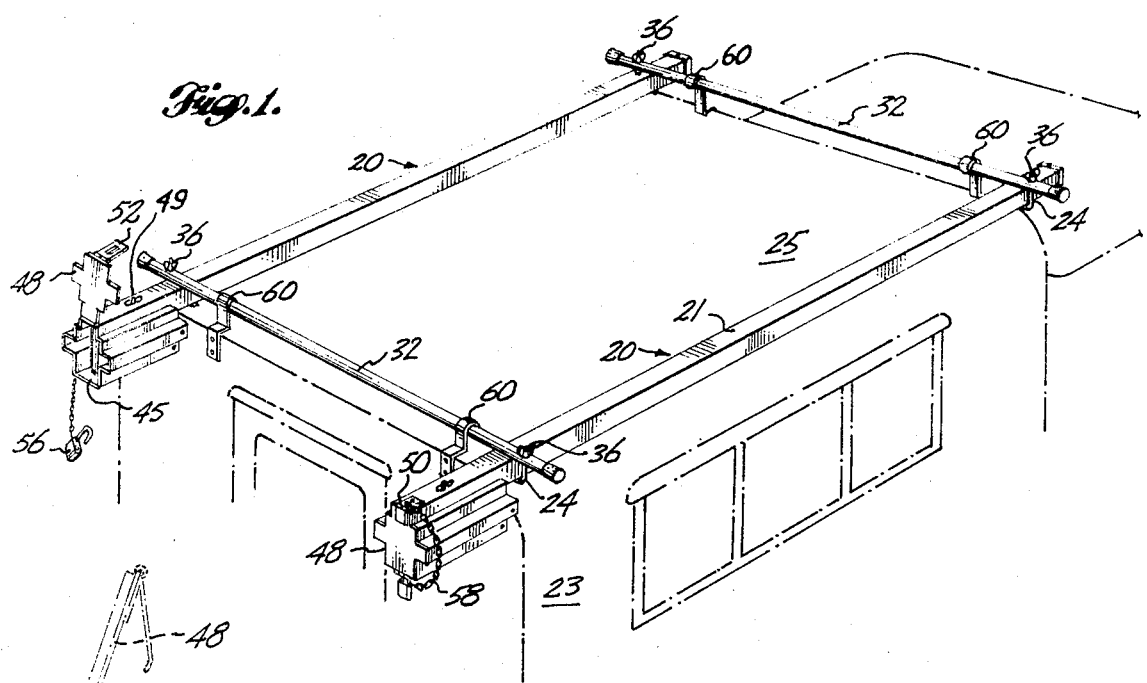
FIG. 1 is a partial view in perspective of the top of a pickup "camper" with two fishing pole and reel carriers attached each being constructed to carry two fishing poles and/or left and right hand operating reels and poles, one carrier being open and the other being closed.
Figure 2:
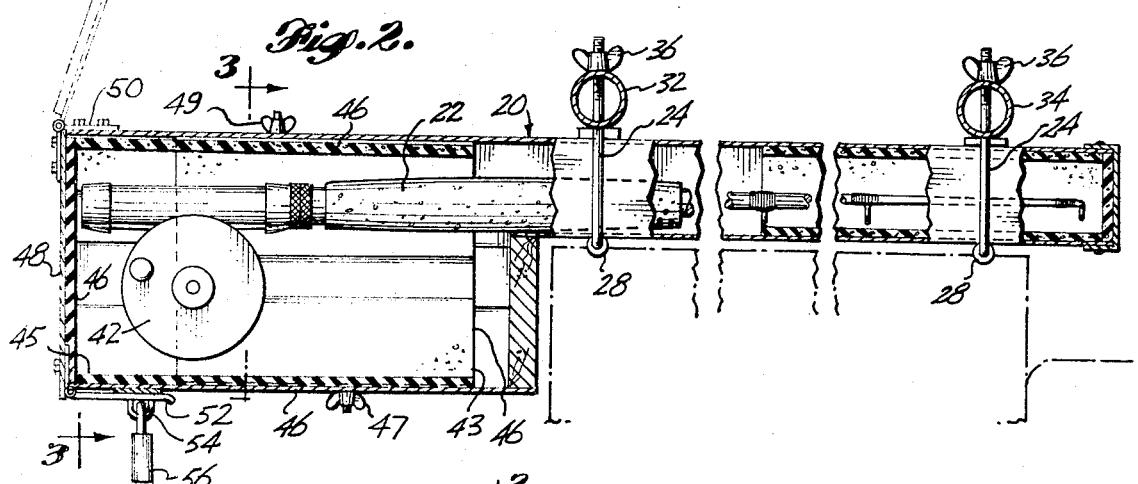
FIG. 2 is a longitudinal partial section of the fishing pole and reel carrier showing the padded chamber for the reel and the continuing length of the carrier, the interior of which accommodates the rod and in dash lines, the opened fitted lid of the carrier in an open position.
Figure 3:
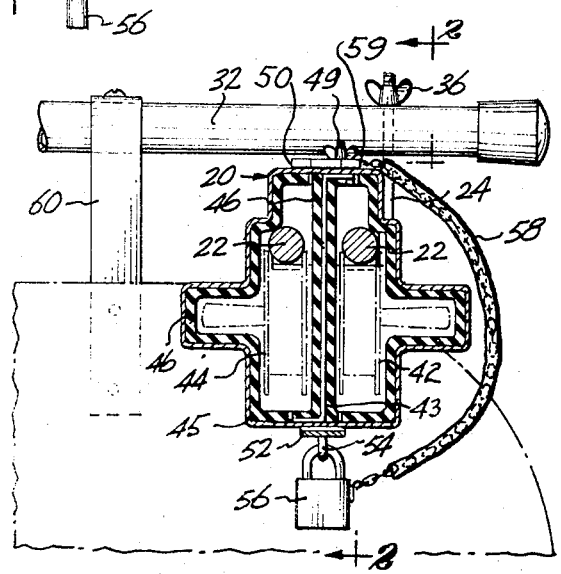
FIG. 3 is a transverse section of the reel end of the carrier taken on line 3—3 of FIG. 2, further illustrating the interior, and also the attachment of the carrier to a portion of a small boat support, which is in turn secured to the pickup camper.

As indicated throughout the views of the drawing, a fully enclosed container or carrier 20 is provided to carry a fully rigged fishing pole 22 and a reel 42 or 44, the reel being either on the right or the left in an enlarged enclosed chamber 46 at the entry of the carrier 20.

This carrier 20 in the illustrated embodiment is mounted on a camper top or automobile roof with, for example, two wing nuts 36 and their respective "L" shaped threaded bolts 24 which pass alongside and under the carrier's exterior and are prevented from scratching or marring finishes by molded rubber sleeves 28. The bolts 24 pass through cross bars 32 which may also be utilized to support a small boat on the camper top 25 of a vehicle.

The fishing pole and reel carrier 20 comprises an elongated formed metal chamber 21 of changeable cross section adapted to the configuration of a ready to go fishing pole 22 and reel 42 or 44. The entry end 45 adapted to the pole's ingress is enlarged to accommodate a reel 42 extending to either the right or left side of the pole 22 by placing the reel 42 on the corresponding side of the carrier 20. There is a partial center partition or plate 43 in this entry end portion 45, to hold the position of certain types of reels to the right or left side. When large reels are used on a pole, this partition 43 may be removed to clear the space by simply loosening the fasteners 47, 49 at the top and bottom.

This enlarged reel receiving portion 45 of carrier 20 is lined with foam rubber 46 which cushions and protects the reel assembly 42. The remaining rod length of the fishing pole 22 extends into the reduced cross-section portion of carrier 20 which is long enough to accommodate a fully rigged and fully extended pole 22 that is ready to go upon withdrawal.

The open end of container or carrier 30 is closed with a fitted lid 48 which pivots on a hinge 50. It is secured with a hasp 52 and eyelet 54 and locked, if preferred, with a padlock 56, which is protected against loss by chain 58 secured by fastener 59.

As illustrated, with the camper, fishing pole and reel carrier 20 is first attached to bars 32 which are in turn secured by metal supports 60 to the top 25 of the camper 23. Bars 32 may support a small boat and/or luggage, etc. This fish pole and reel carrier 20 may be as readily attached in other ways directly and indirectly to automobile roofs, truck roofs, yachts, airplanes, etc.

Other embodiments of this carrier 20 hold only one fishing pole with the enlarged entry portion 45 positioned either on the right or left to accommodate a corresponding right or left handed operated reel. Also, where required, wider carriers 20 are provided to hold a group of ready to go fishing poles 22 and reels 42 or 44.

Moreover, for convenience of storage, the elongated portion of carrier 20 which receives the rod 22, may be constructed of telescoping sections. Whatever changes may be undertaken, all of them are directed to providing a carrier 20 which will completely enclose and protect a fishing pole and reel, that are fully rigged and ready to be used immediately upon reaching the fishing locale.

SUMMARY OF ADVANTAGES

The sportsman is provided with a durable securely mounted fishing pole carrier 20 that will accommodate a fishing pole 22 with either a left handed or right handed fishing reel 44, 42 or one assembly of each. The poles 22 and reels 44, 42 are safely enclosed in a carrier that will protect it from weather and other environmental elements, such as severe dust conditions created during travel over dry unpaved roads. As illustrated, the container or carrier 20 is especially well adapted to be secured to a pickup truck and camper. It is also mounted on an automobile with slight modifications and easily stored on the wall of a dwelling.

What was previously considered an inconvenient extended fishing pole 22 and reel 42, 44 combination is now quickly and easily slipped into this container or carrier 20 that keeps it safely and securely out of the way, until at a moment's notice, it is withdrawn and the fisherman has a ready to go fully extended and rigged fishing pole.

I claim:

1. A container-carrier for fully rigged ready to go assemblies of fishing poles, reels, lines and lures, adapted to be mounted on a vehicle, such as a pickup truck camper, comprising:
    a. a container-carrier encompassing body having an enlarged padded chamber at an entry end divided by a removable padded partition to receive two reels separated by the padded partition and to receive a larger single reel when the padded partition is removed, all reels being secured, as an assembly, to a pole, line and lure, and having a continuing elongated chamber with a closed end to receive and to protect the extending length of inserted fishing poles;
    b. a pivotal cover hingedly mounted to the entry end of the enlarged chamber of the encompassing body having a locking means between the pivotal cover and the enlarged chamber to prevent unwanted withdrawal of assemblies of fishing poles, reels, lines and lures; and
    c. fastening assemblies secured to the encompassing body and securable also to a vehicle to keep the container-carrier firmly in position on the vehicle when the assemblies of fishing poles, reels, lines and lures are being transported.

* * * * *